US005532140A

United States Patent [19]
Arnold et al.

[11] Patent Number: 5,532,140
[45] Date of Patent: Jul. 2, 1996

[54] METHOD AND APPARATUS FOR SUSPENDING MICROPARTICLES

[75] Inventors: Stephen Arnold, New York, N.Y.; Piers Hendrie, Austin, Tex.; Burt V. Bronk, Abingdon, Md.

[73] Assignee: The United States of America as represented by the Secretary of the Army, Washington, D.C.

[21] Appl. No.: 216,863

[22] Filed: Mar. 23, 1994

[51] Int. Cl.[6] ............................ C12M 1/34; C12Q 1/04; G01N 27/62; H01J 49/42

[52] U.S. Cl. ............................ 435/34; 250/282; 250/283; 250/292; 250/293; 422/98; 436/153; 436/181; 435/286.2; 435/287.1

[58] Field of Search ................................ 435/7.1, 7.2, 34, 435/39, 289, 291, 961, 968, 286.2, 287.1; 436/35, 36, 149, 153, 172, 181, 514; 422/83, 86, 98; 250/283, 292, 293, 282

[56] References Cited

U.S. PATENT DOCUMENTS

| | | | |
|---|---|---|---|
| 3,617,736 | 11/1971 | Barnett et al. | 250/292 |
| 3,665,245 | 5/1972 | Schwarz | 250/292 |
| 4,170,520 | 10/1979 | Weaver | 435/291 |
| 4,283,626 | 8/1981 | Siegel | 250/282 |
| 4,755,670 | 7/1988 | Syka et al. | 250/292 |
| 5,182,451 | 1/1993 | Schwartz et al. | 250/282 |

FOREIGN PATENT DOCUMENTS 81567  4/1987  Japan ..................... 435/968

OTHER PUBLICATIONS

Analytical Chemistry, vol. 49, No. 11, issued Sep. 1977, Lawson et al, "Weak Peak Enhancement by Selective Ion Trapping . . . ", pp. 1619–1622.

*Primary Examiner*—Jeffrey E. Russel
*Attorney, Agent, or Firm*—Edward Goldberg; Michael C. Sachs; Edward L. Stolarun

[57] ABSTRACT

A device and method is described for joining two or more small particles to form a composite levitated particle. The size of the particles joined may be in the range 0.1 micrometer to 30 micrometers. The device utilizes a linear quadrupole electrodynamic levitator with storage rings at right angles to the levitating electrodes. The storage rings move the charged particles to desired positions with DC electric fields. Particles with different sign but unequal charge are then joined by means of displacements caused by the DC fields of the storage rings. The initial particles and the final composite particle are retained free of any contact with substrate in the levitating fields of the linear levitator.

16 Claims, 3 Drawing Sheets

METHOD AND APPARATUS FOR SUSPENDING MICROPARTICLES

GOVERNMENT PROPERTY RIGHTS

The invention described herein may be manufactured, used and licensed by or for the government for governmental purposes.

BACKGROUND OF THE INVENTION

1. Field of the Invention

The present invention relates to the detection and identification of micron-sized particles including liquids, biological microorganisms, chemical particles and unknown analytes. It also pertains to the construction of special particles for test or manufacturing purposes.

2. Description of the Prior Art

The recognition of agents of biological origin and the identification of unknown microorganisms in a sample of micron-sized particles has received much attention in the recent past. The threat caused by biological weapons was widely publicized during recent military operations in the Middle East. As a result of that military experience, it was recognized that detection of a biological threat is significantly different from the detection of a chemical threat.

One of the major differences is that biological particles in an aerosol may be significant at concentrations which are thousands to tens of thousands of times less than chemical threat concentrations. A single microorganism in a background of 100–1,000 particles of battlefield dust may be only double the background level but nonetheless be a lethal threat.

It is possible to measure changes which are quite small compared to a typical background of battlefield dust, with instruments which recognize single particles as they are processed one by one at a total rate of thousands per second. It is also feasible to make such determinations under field conditions by adding micron-sized amounts of reagent (such as antibodies) to particular threats on a particle by particle basis and to detect the presence or absence of the threat in each particle with a fluorescent marker. Research to develop a UV fluorescence point sensor to detect individual particles with biological type fluorescent signatures is promising. Microorganisms will trigger the device but the auto-fluorescent signature is not unique. There are indications, however, that each microorganism may have a unique fluorescent signature and additional research is being conducted in this area.

Electrodynamic balances are known to exist which have been used to suspend micron-sized particles in an alternating electric field for indefinitely long periods of time by adding solid or liquid materials to the suspended particles in amounts which are less than or equal in volume to the original particle.

This serves the following purposes:

1. to test the microparticle for physical or chemical changes as compared to the particle without the added material;
2. to use the additive as a test for the presence of a given chemical or biological component of the unknown particle;
3. to do sequential tests of the type mentioned in paragraph 2, above, on the same particle;
4. to add known components in an effort to form particles of a desired type with highly specified properties.

The prior art has injected the additive in the following ways:

1. adding material to the particle in the gas phase;
2. squirting a second charged particle in the chamber in an uncontrolled way in hopes that it will collide with the first particle and stick to it;
3. adding the additional material to the bulk material before suspending the particle;
4. adding a droplet to the first particle attached to a microscope slide.

SUMMARY OF THE INVENTION

The present invention provides an instrument which makes it possible to count the number of threat particles so as to generate an alarm at the low absolute concentrations which are significant for biological weapons. The instrument can also be used to detect the presence of chemicals which are discharged in the manufacture of illicit substances. A further use of our invention is to track sources of infection in a hospital. Particles are captured from air supplies and joined to reagents to test for various microorganisms, thus sources of extremely small numbers of infectious bacteria may be located.

The results obtained by the prior methods were not satisfactory. In the approach which required the addition of material to the particle in the gas phase, it was found that it is difficult to control the amount of material added witch any precision. Further, solids or liquids having a low vapor pressure cannot be added in this manner.

Squirting a second charged particle into the chamber is inherently unreliable. The squirting procedure may be required to be repeated over a long period of time to succeed in achieving the required collisions.

The problem with adding the additional material to the bulk material before suspending the particle is that one cannot perform sequential procedures and ascertain the results of each step. One cannot add one material after the other to the same particle.

Utilizing a microscope slide has resulted in both the original particle and the additive being disturbed by the presence of the substrate. For example, scattered light or fluorescence of the substrate may interfere with observation of very small amounts of fluorescence from the particle.

Further, it was found to be relatively easy to remove a suspended particle from an electrodynamic balance for further tests. It is difficult or impossible to remove a particle sticking to a substrate for further tests.

The present invention overcomes the disadvantages of the prior art. Particles can be held in our invention while waiting to be joined until other apparatus is prepared. With our invention, precise amounts of any chemical can be added to a microdroplet. The procedure employed with our invention is repeatable in a routine and reliable fashion. In our method and apparatus, a particle may be isolated from any substrate before and after the addition of additional material. Our method and apparatus is further characterized by the ability to perform sequential additions to suspended microparticles.

Using a quadrupole electric field mass-analyzer ("QMA") individual charged particles can be selected in air and joined.

An isolated microparticle has been called the "world's smallest test tube". Analyzing what is contained in such a "test tube" usually requires use of a photophysical interaction. For example, a levitated microparticle can be irradiated with monochromatic light and its Raman spectrum determined. If the solute of interest is in small quantity, then a more sensitive probe is needed, such as fluorescence. However, not all samples have a large quantum efficiency for fluorescence. To overcome this limitation, it would be desirable to add acceptor molecules to the unknown particle and utilize fluorescence from the acceptor in determining the concentration of the unknown donor. In order to accomplish this, the apparatus must have means for isolating, selecting and joining individual aerosol particles.

BRIEF DESCRIPTION OF THE DRAWINGS

These as well as further objects and advantages of the invention will become apparent to those skilled in the art from a review of the following detailed specification, reference being made to the accompanying drawings in which.

Throughout the drawings, like-numbered elements are shown which are intended to be the same.

DETAILED DESCRIPTION OF THE PREFERRED EMBODIMENTS

Figure 1:
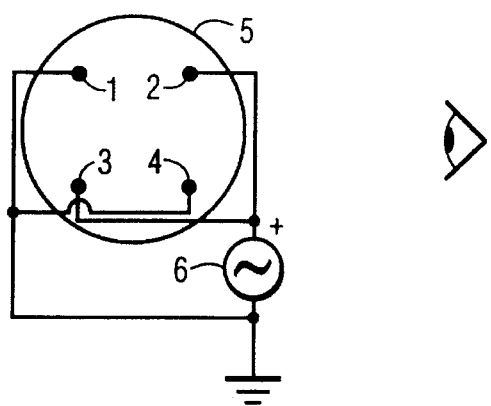
FIG. 1 is a diagrammatic end view of the quadrupole mass analyzer used in our invention.

The present invention utilizes a linear QMA, generally shown as 5. As shown in FIG. 1, the QMA has four rods (1–4), which in the preferred embodiment are of 1.5 mm diameter arranged in a square 5 mm apart. The QMA has a length of approximately 112 mm and has an axial center along a center line positioned equidistant from each of the rods 1, 2, 3, 4. The QMA holds the charged particle along and just below its axial center by alternating gradient pseudopotential forces. These forces result from a varying electric field produced in the area between the rods 1, 2, 3, 4, which is generated by a source of AC voltage 6 connected across diagonally opposite rods 1, 4 and 2, 3.

Figure 2:
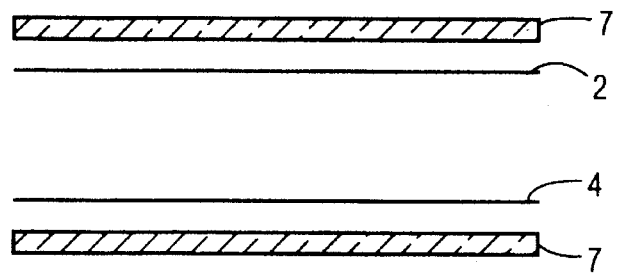
FIG. 2 is a side view of the quadrupole mass analyzer of FIG. 1.

As shown in FIG. 2, the QMA is housed in a glass (or other nonconducting material) tube 7 of one-half inch outer diameter.

The present invention includes means for delivering particles along the axis of the linear QMA described in FIGS. 1–2. The apparatus also includes means for moving these particles to particular longitudinal positions along the axis and means for joining two or more of these particles. These processes are accomplished by assembling one or more microparticle retaining rings 8 at positions along the length of the QMA (see FIG. 3A, FIG. 4 and FIG. 5), which are also referred to as parking rings, which function under a sequence of potentials as a means for gating particles into different longitudinal positions in the QMA.

Figure 3A:
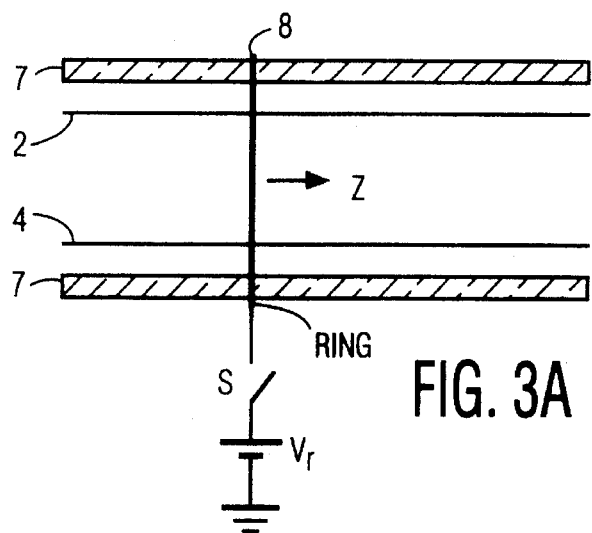
FIG. 3A is a diagrammatic side view of a modification to the quadrupole mass analyzer of FIG. 1.
Figure 3B:
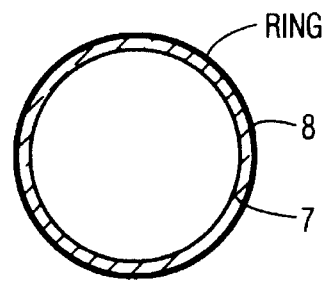
FIG. 3B is an end view of the ring embodied in FIG. 3A.

As shown in FIG. 3A–B, a parking ring 8 consists of a ring of conducting material which is placed on the outside of the glass tube 7. FIG. 3A is a side view of the QMA 5 applying the ring 8, and FIG. 3B is an end view of the rings circling the QMA tube 7.

The ring 8 is connected to a source of potential $V_r$ via switch S.

The parking ring 8 provides potential along the central "Z" axis of the quadrupole in the form of $\Phi = kV_1/(R^2+Z^2)^{1/2}$ where R is the ring radius, and $V_1$ is its potential when switch S is closed. Consequently, a particle of charge q feels a force from this ring, which is equal to $-q\, d\Phi/dz$ or $-zq\, kV_1/(R^2+Z^2)^{3/2}$.

For small excursions this force is proportional to Z. Thus, a particle of opposite charge from the sign of the potential will be drawn to the ring; however, once at its center, the attracting force vanishes. The potential is parabolic with Z for small excursions.

Figure 4:
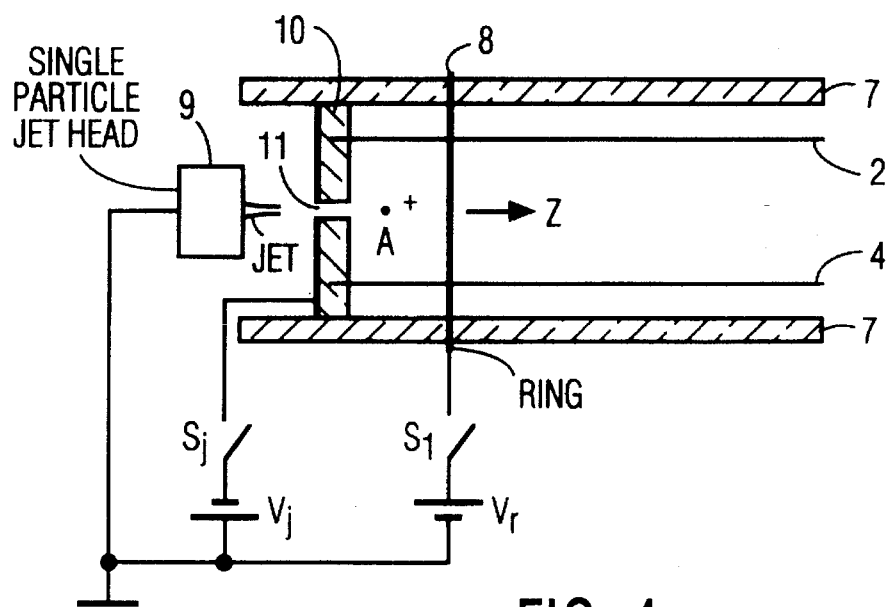
FIG. 4 is a diagrammatic side view of a system employing FIG. 3A.

As shown in FIG. 4, a particle is ejected from a source, such as a single particle jet head 9. The ejected particle is charged by induction (with potential $V_j$) as it exits the orifice 11 of the jet head 9 to one side of the ring 8. The charged particle moves into the electric field between the four rods 1 (not shown), 2, 3 (not shown), 4 and is held vertically by the alternating gradient pseudopotential forces as discussed with respect to FIG. 1 and its motion along and just below the axial center of the QMA terminates due to drag at position A. When switch $S_1$ is closed, the particle "scoots" toward the ring 8 and resides at its center consistent with the prior-mentioned force equation.

More particularly, the output from the particle jet head 9 is connected to an induction charger consisting of a charging electrode 10 having an orifice 11 at its center. Switch $S_j$ is connected to charging electrode 10 and to potential source $V_j$. When switch $S_j$ is closed induction causes the particles from jet head 9 to be charged to potential $V_j$.

Figure 5:
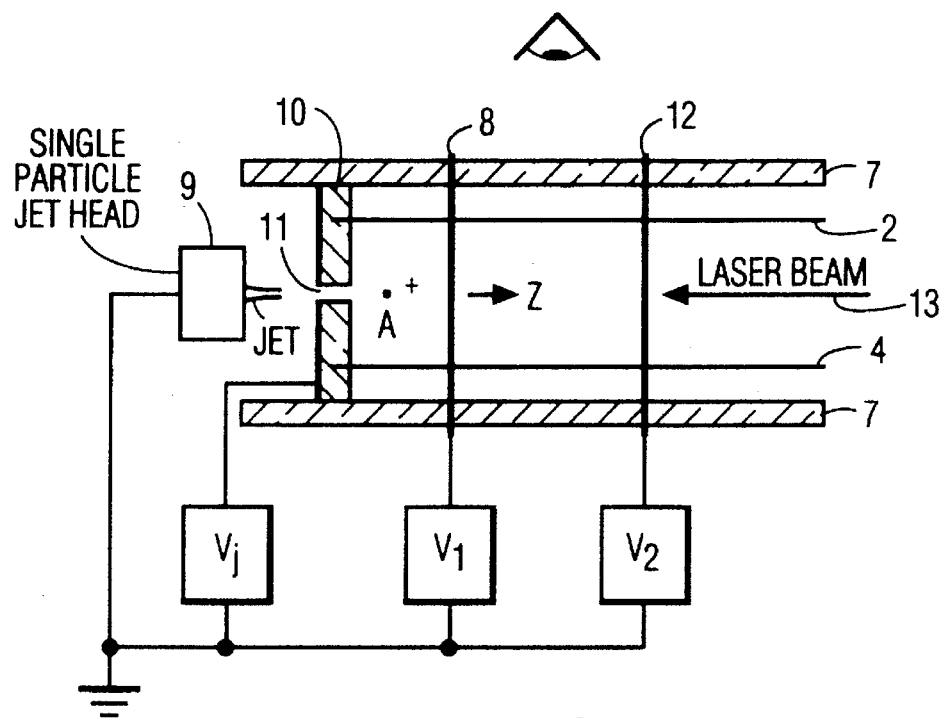
FIG. 5 is a diagrammatic side view of a further modification to FIG. 4.

It can now be seen how the particle can be manipulated using multiple rings as shown in a two ring (8, 12) configuration in FIG. 5. A laser beam 13 illuminates the particles on the axis so that the user may view the process.

Power supplies $V_j$, $V_1$, and $V_2$ may be batteries or bipolar power supplies. Supply $V_j$ is connected to charging electrode 10. Supply $V_1$ is connected to ring 8 and supply $V_2$ is connected to ring 12.

Figure 6:
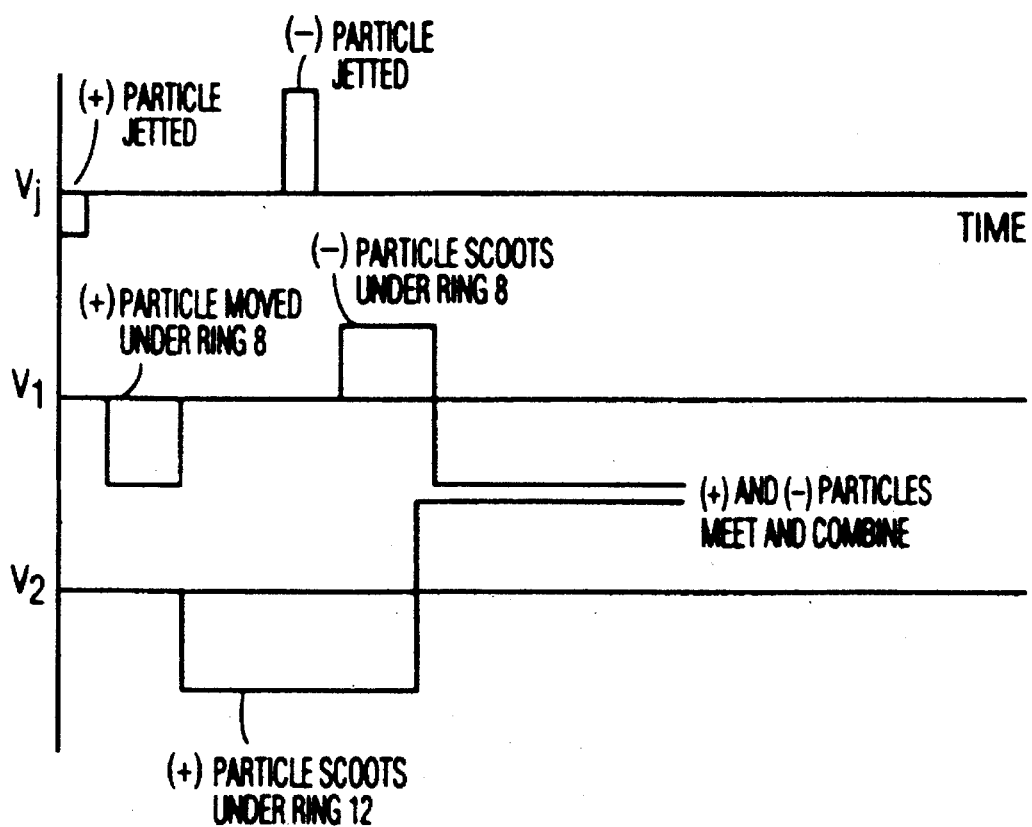
FIG. 6 is a timing diagram of electrical potentials applied to the element of FIG. 5.

The operation of our FIG. 5 of invention may be further understood with reference to the timing diagram of FIG. 6, which shows the joining of two particles having opposite and unequal magnitude charges. The charge magnitudes may be controlled by the selection of the magnitudes used for charging potential Vj. The particles may be from different substances in which case different particle jet heads would have to be used sequentially or a second jet head may be inserted at the right hand side of the QMA. However, for simplicity, the operation of FIG. 5 will be described in connection with FIG. 6.

First, the potentials of $V_j$, $V_1$, and $V_2$ are controlled. Then, a positive particle is jetted from the single particle jet head 9. To accomplish this result, $V_j$ is set to a negative potential shown in FIG. 6. With the particle out of the jet head 9, potential $V_j$ is returned to ground. Later, corresponding to the drag relaxation time, ring 8 is energized to a negative potential. This moves the positive particle to the ring's center.

In order to now move this particle to ring 12, (so that another particle may be loaded), the potential to ring 8 is grounded and the potential to ring 12 is switched to negative as shown in FIG. 6. Once again, the particle "scoots" to the oppositely charged ring and sits at the center of ring 12.

Now, the jet induction potential $V_j$ is set positive and a negative particle is ejected from the single particle jet head 9. Potential $V_1$ to ring 8 is then turned positive causing the negative particle to "scoot" under ring 8. To join the particles, switching of the potentials of rings 8 and 12 as follows is required:

First, ring 12 is switched positive to draw the negative particle at ring 8 slightly toward it. Then, ring 8 is switched negative which repels the negative particle toward ring 12. Both particles moving toward each other now meet and combine.

As shown in FIG. 6, the negative particle has a larger absolute charge (by about a factor of 3) in comparison to the positive particle. Thus, when the two particles combine in the example, the net charge on the compound particle will be negative. Since the quadrupole pseudopotential produces forces which are ignorant of the charge state, this particle will be retained as are the positive and negative particles from which it was formed.

It will be understood that, as modifications to the invention may be made without departing from the spirit and scope of the invention, what is sought to be protected is set forth in the appended claims.

We claim:

1. A method for joining charged particles comprising the steps of:

injecting a first charged particle into a quadrupole mass analyzer;

applying a first electrical potential to said quadrupole mass analyzer for positioning said charged particle at a first location in said quadrupole mass analyzer;

applying a second electrical potential to said quadrupole mass analyzer for advancing said first charged particle from said first location in said quadrupole mass analyzer to a second location in said quadrupole mass analyzer;

injecting a second charged particle into said quadrupole mass analyzer;

applying a third electrical potential to said quadrupole mass analyzer to advance said second charged particle to said first location; and applying a fourth electrical potential to said quadrupole mass analyzer for causing said first charged particle to move toward said first location and said second charged particle to move toward said second location, said first and second charged particles being joined by collision, the resulting combined particle remaining suspended in said quadrupole mass analyzer.

2. Apparatus for joining charged particles comprising:

a quadrupole mass analyzer;

means for injecting a first charged particle into said quadrupole mass analyzer;

means for applying a first electrical potential to said quadrupole mass analyzer for positioning said first charged particle at a first location in said quadrupole mass analyzer;

means for applying a second electrical potential to said quadrupole mass analyzer for advancing said first charged particle from said first location in said quadrupole mass analyzer to a second location in said quadrupole mass analyzer;

means for injecting a second charged particle into said quadrupole mass analyzer;

means for applying a third electrical potential to said quadrupole mass analyzer to advance said second charged particle to said first location; and means for applying a fourth electrical potential to said quadrupole mass analyzer for causing said first charged particle to move toward said first location and said second charged particle to move toward said second location, said first and second charged particles being joined by collision, the resulting combined particle remaining suspended in said quadrupole mass analyzer.

3. Apparatus for joining charged particles comprising: a quadrupole mass analyzer, means for injecting particles into said quadrupole mass analyzer, means in said quadrupole mass analyzer for impressing an electrical charge on said particles, first means connected to a portion of said quadrupole mass analyzer for positioning one of said charged particles at a first position in said quadrupole mass analyzer, second means connected to another portion of said quadrupole mass analyzer for positioning another of said charged particles at a second position in said quadrupole mass analyzer, and control means connected to said first and second means for causing said charged particles at said first and second positions to move towards each other and join by collision and remain suspended in said quadrupole mass analyzer.

4. The apparatus of claim 3 wherein said quadrupole mass analyzer includes a housing and a plurality of rods mounted in said housing, and each of said means for positioning said particles includes a ring of conducting material.

5. The apparatus of claim 4 further including a source of electrical potential connected to said injecting means, said quadrupole mass analyzer, and said rings.

6. The apparatus of claim 4 wherein each of said rings are spaced apart from each other and surrounds the plurality of rods at different longitudinal positions thereof to thereby establish said first and second positions within said rings and said rods.

7. The apparatus of claim 3 wherein the means for impressing an electrical charge on said particles results in charged particles having opposite and unequal charges in their pre-collision state, such that after collision the combined particles have a net charge which enables the combined particles to be retained in position by one of said means for positioning.

8. Apparatus for joining a pair of oppositely charged particles comprising:

means for generating a quadrupole electric field, including a parallel array of spaced-apart quadrupole electrodes and means for applying alternating current energization to said electrodes to thereby produce the quadrupole electric field between said electrodes;

means for injecting a charged particle into the quadrupole electric field;

means for retaining said charged particle in a levitated state at a substantially fixed location within the quadrupole electric field;

means for injecting another charged particle having an opposite charge to that of said charged particle into the quadrupole electric field;

said another charged particle being levitated by the quadrupole electric field toward said charged particle such that both particles join together; and means for retaining the joined particles in a levitated state at a substantially fixed location within the quadrupole electric field.

9. The apparatus of claim 8 further including:

means for retaining said another charged particle in a levitated state at another substantially fixed location prior to the joining of the particles; and control means for releasing the charged particles from their substantially fixed locations to thereby enable the relative movement of the particles toward each other which results in the particles joining together.

10. The apparatus of claim 8 wherein the magnitude of charge on said charged particle is different from the magnitude of charge on said another charged particle, such that the joined particles have a resultant charge.

11. The apparatus of claim 8 wherein said means for retaining a charged particle in a levitated state at a substantially fixed location includes an electrically conductive ring having a center within said quadrupole electric field which corresponds to said substantially fixed location.

12. The apparatus of claim 11 further including means for retaining said another charged particle in a levitated state including another electrically conductive ring spaced apart from said electrically conductive ring and having a center within said quadrupole electric field which corresponds to said another substantially fixed location.

13. A method for controllably joining a pair of charged particles comprising:

injecting a charged particle into a quadrupole electric field;

retaining said charged particle in a levitated state at one location within the quadrupole electric field;

injecting another charged particle into the quadrupole electric field;

relatively moving said charged particles toward each other to thereby achieve a joining of the particles; and retaining the joined particles in a levitated state at a substantially fixed location within the quadrupole electric field.

14. The method of claim 13 wherein the charged particles injected into the quadrupole electric field have opposite charges.

15. The method of claim 14 wherein the charged particles have charges which differ in magnitude by a factor of about three.

16. The method of claim 13 further including the step of:

retaining said another charged particle in a levitated state at another location within the quadrupole electric field.

* * * * *